F. PALOMBO.
VEHICLE WHEEL.
APPLICATION FILED MAR. 29, 1919.
1,333,770.
Patented Mar. 16, 1920.
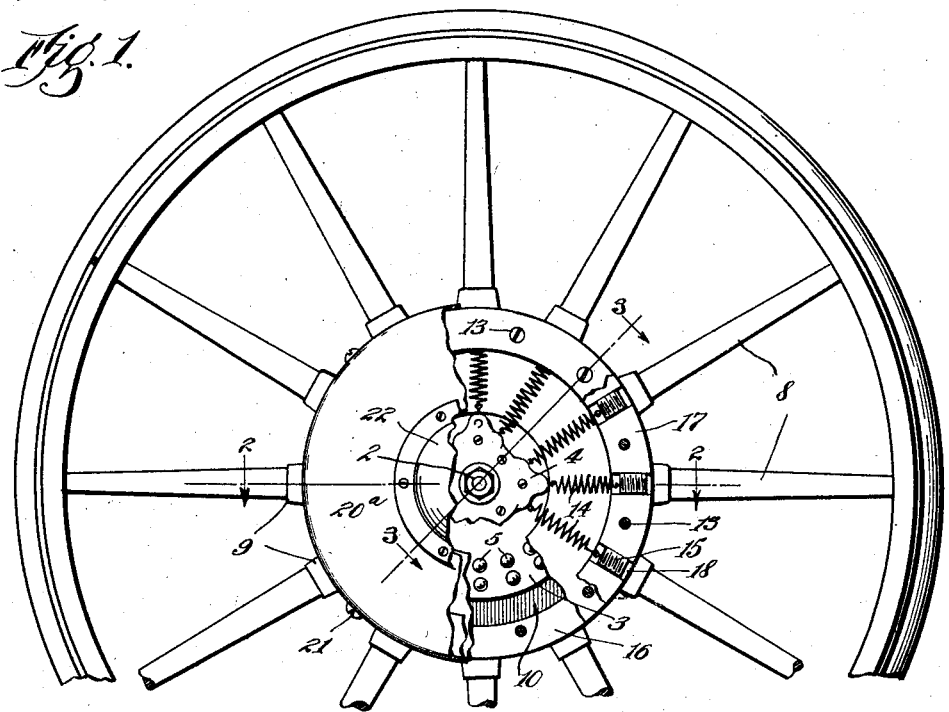
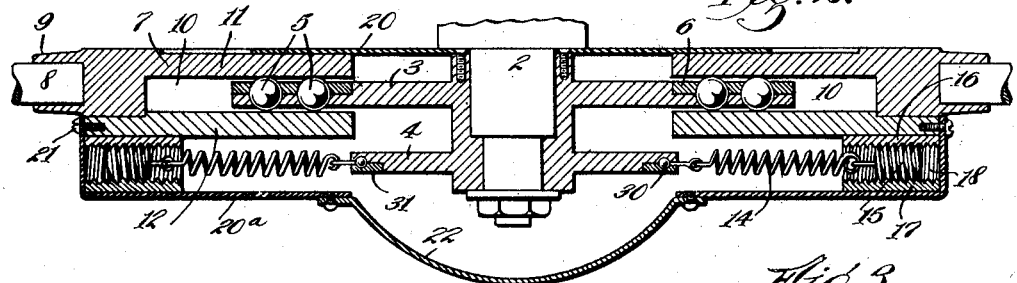
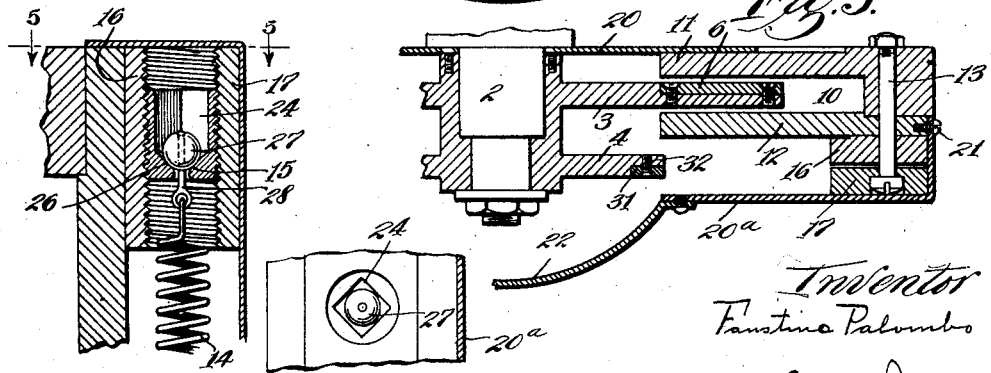
Inventor
Faustino Palombo
By John A. Bommhardt
Atty.

UNITED STATES PATENT OFFICE.

FAUSTINO PALOMBO, OF CLEVELAND, OHIO.

VEHICLE-WHEEL.

1,333,770.

Specification of Letters Patent.  Patented Mar. 16, 1920.

Application filed March 29, 1919. Serial No. 285,944.

*To all whom it may concern:*

Be it known that I, FAUSTINO PALOMBO, a subject of the Government of Italy, residing at Cleveland, in the county of Cuyahoga and State of Ohio, have invented certain new and useful Improvements in Vehicle-Wheels, of which the following is a specification.

This invention relates to vehicle wheels and has for its object the provision of a wheel which can be used to take the place of those equipped with pneumatic tires. The wheel has a hub cushioned by springs with respect to the rim.

In the embodiment of the invention shown in the accompanying drawings, Figure 1 is a side elevation of the wheel, certain parts being broken away for convenience of illustration; Fig. 2 is a section on the line 2—2 of Fig. 1; Fig. 3 is a section on the line 3—3 of Fig. 1; Fig. 4 is a sectional detail of the swivel connection used in supporting the springs and Fig. 5 is a section on the line 5—5 of Fig. 4.

The device comprises a hub portion 1 secured in any suitable manner to the axle 2 and provided with two circular flanges or disks 3 and 4 near the inner and outer ends thereof. The disk 3 is provided with a plurality of apertures in which are placed ball bearings 5, said bearings being held in place by retaining ring 6 screwed to the disk 3, as shown in Fig. 3. A circular casting 7 has secured to its periphery the spokes 8 of the wheel proper by means of sockets 9 formed therein, and is hollowed out as shown at 10 to provide one side of a ball race 11, a similar shaped disk 12 forming the opposite side of the ball race and is secured to the casting 7 by bolts 13. The disk has secured to its periphery the ends of a plurality of radial tension springs 14 in a manner to be hereinafter described, the opposite ends of the aforesaid springs being secured to plugs or bushings 15 threaded between two annular rings 16 and 17, said rings being secured to the casting 7 and disk 12 by the bolts 13, the rings 16 and 17 each being provided with one half of threaded bores 18 for the reception of the before mentioned bushings 15. At the inner side a plate 20 is secured to the casting 7 by means of screws threaded therein and, with the addition of a stamped metal cover 20ª secured to the ring 12 by screws 21, forms a means for effectively inclosing the working parts. A hand hole in the central part of the cover 20ª is closed with an ornamental hub cap 22 secured in place by screws as shown.

Means for adjusting and centering the springs 14 are provided as follows: A bore 24, preferably square in section for the application of a wrench, is provided in the bushing 15, and a tapered seat 26 supports a ball 27 to which is riveted the end of an eye bolt 28 which projects through an opening in the bottom of said bushing and has secured to its eye the end of the spring 14. The opposite end of the spring is secured in similar manner to the disk 4, the ball joint 30 being held in place by the retaining ring 31 secured to the disk 4 by screws 32. Adjustment being required it is merely necessary to remove the cover 20ª, loosen bolts 13, and adjust bushings as desired by applying a wrench to the squared bore 24, the ball joint providing against twisting of the springs. The necessary adjustment being obtained the bushings are clamped against movement by tightening the bolts 13, the rings 16 and 17 acting to clamp the bushings therebetween.

The ball bearing 5 permits the hub plate 3 to travel easily between the disks 11 and 12, to the extent permitted by the springs 14 which cushion the hub with respect to the outer part of the wheel.

I claim:

A wheel having a hub with a radial flange, a surrounding casing having a guide in which said flange works, radial hollow screw plugs adjustably secured in the casing, balls confined in said plugs, bolts connected to said balls, and radial tension springs connected at their outer ends to said balls and at their inner ends to the hub.

In testimony whereof I do affix my signature in presence of two witnesses.

FAUSTINO PALOMBO.

Witnesses:
JOHN A. BOMMHARDT,
ROBERTSON BOWIE.